US006972307B2

(12) United States Patent
Zimmer et al.

(10) Patent No.: US 6,972,307 B2
(45) Date of Patent: Dec. 6, 2005

(54) RUBBER COMPOSITION CONTAINING NANOSCALED ZINC OXIDE PARTICLES

(75) Inventors: Rene Jean Zimmer, Howald (LU); Claude Ernest Felix Boes, Erpeldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 69 days.

(21) Appl. No.: 10/631,045

(22) Filed: Jul. 29, 2003

(65) Prior Publication Data

US 2005/0027054 A1 Feb. 3, 2005

(51) Int. Cl.[7] ............................................... C08K 3/22

(52) U.S. Cl. ...................... 524/432; 524/492; 524/445; 524/495; 524/496; 524/262

(58) Field of Search ............................... 524/432, 492, 524/445, 495, 496, 262

(56) References Cited

U.S. PATENT DOCUMENTS

| | | | | |
|---|---|---|---|---|
| 2,940,830 A | 6/1960 | Thornhill | ..................... | 23/182 |
| 4,644,988 A | 2/1987 | Ahmad et al. | .......... | 152/209 R |
| 5,066,420 A | 11/1991 | Chevallier | ............... | 252/313.2 |
| 5,087,668 A | 2/1992 | Sandstrom et al. | ......... | 525/237 |
| 6,121,346 A | 9/2000 | Visel et al. | ................. | 523/200 |
| 6,225,397 B1 | 5/2001 | Materne et al. | ............. | 524/493 |
| 6,462,100 B1 | 10/2002 | Thunhorst et al. | ............ | 521/53 |
| 6,555,606 B1 | 4/2003 | Agostini et al. | ............ | 524/264 |

FOREIGN PATENT DOCUMENTS

| | | | |
|---|---|---|---|
| CN | 1368518 A | * 9/2002 | |
| CN | 1386788 A | * 12/2002 | |
| CN | 1398923 A | * 2/2003 | |
| DE | 1 299 419 | 7/1969 | ........... C08C 17/28 |
| DE | 2 325 557 | 12/1974 | ........... C08C 11/08 |
| DE | 199 07 704 A1 | 8/2000 | ............ C08K 3/22 |

OTHER PUBLICATIONS

Database CN 'Online !Chemical Abstracts Service Data Sheet of Chinese Patent No. CN 1 386 788.

Derwent Publication Data Sheet of Chinese Patent No. CN 1 386 788.

Database CN 'Online !Chemical Abstracts Service Data Sheet of Chinese Patent No. CN 1 368 518.

Copy of European Search Report.

* cited by examiner

*Primary Examiner*—Ling-Sui Choi
(74) *Attorney, Agent, or Firm*—John D. DeLong

(57) ABSTRACT

A rubber composition containing a filler comprising 100 parts by weight of at least one rubber containing olefinic unsaturation, 1 to 250 phr of a filler, and 0.05 to 5.0 phr of zinc oxide particles having a diameter of less than 20 nanometers. This composition can be used to form a component of a tire, especially a tread of a tire.

17 Claims, No Drawings

RUBBER COMPOSITION CONTAINING NANOSCALED ZINC OXIDE PARTICLES

BACKGROUND OF THE INVENTION

Nanomaterials are materials with particles having a diameter from 1 to 100 nanometers. The use of such nanomaterials in rubber is known from U.S. Pat. No. 4,644,988 describing a tire tread compound containing a styrene-butadiene copolymer rubber reinforced with carbon black with a particle size smaller than 20 nanometers. U.S. Pat. Nos. 6,121,346 and 6,225,397 B1 disclose the use of silica fillers with primary particles having a particle size in the range of from 5 to 30 nanometers in a rubber also comprising zinc oxide in an amount of 2 phr to 5 phr.

U.S. Pat. No. 5,066,420 presents a method to produce nanoscaled silica particles having a spherical form and a mean particle diameter of between 10 nanometers and 100 nanometers.

A method to produce a nanoscaled zinc oxide with a mean particle diameter of from 5 nanometers to 10 nanometers starting from commercially available, comparatively cheap educts is described in DE 199 07 704 A1. These zinc oxide particles can be redispersed in water, organic solvents or mixtures with organic solvents or surface modifying substances in order to get a sol with a large extent of primary particles.

The increasing concern regarding the potential environmental and health effects of the release of zinc oxide (ZnO), which is also often accompanied by a release of cadmium, makes it eligible to reduce its content in rubber compositions, especially in rubber compositions used in the production of tires, but also to retain its positive effects in the curing/vulcanization process.

SUMMARY OF THE INVENTION

The present invention relates to rubber compositions containing 0.05 phr to 5.0 phr of zinc oxide particles having a diameter of less than 20 nanometers, their use as or in a component of a tire, especially after sulfur vulcanization, and methods to produce such rubber compositions.

DETAILED DESCRIPTION OF THE INVENTION

There is disclosed a rubber composition containing a filler comprising (a) 100 parts by weight of at least one rubber containing olefinic unsaturation, (b) 1 to 250 phr of a filler, and (c) 0.05 to 5.0 phr of zinc oxide particles having a diameter of less than 20 nanometers.

Furthermore, there is disclosed a sulfur-vulcanized rubber composition which is prepared by heating said rubber composition to a temperature ranging from 100° C. to 200° C. in the presence of a sulfur-vulcanizing agent.

In addition, there is disclosed a first method of processing a rubber composition containing a filler comprising mixing (a) 100 parts by weight of at least one rubber containing olefinic unsaturation with (b) a mixture comprising 1 to 250 phr of a filler and 0.05 to 5.0 phr of zinc oxide particles having a diameter of less than 20 nanometers, a second method of processing a rubber composition containing a filler comprising mixing (a) 100 parts by weight of at least one rubber containing olefinic unsaturation, (b) 1 to 250 phr of a filler, and (c) a mixture of 0.05 to 5.0 phr of zinc oxide particles having a diameter of less than 20 nanometers with a processing additive, and a third method processing a rubber composition containing a filler comprising mixing (a) 100 parts by weight of at least one rubber containing olefinic unsaturation with (b) a master-batch comprising a polymer and 0.05 to 5.0 phr of zinc oxide particles having a diameter of less than 20 nanometers.

In one aspect of this invention, the filler comprises primary particles of silica having a diameter in a range of from 5 to 25 nanometers, which form at least partially clusters or aggregates having a diameter in a range of from 40 nanometers to 500 nanometers.

In an other aspect of this invention, the rubber composition comprises 0.1 phr to 1.5 phr, preferably 0.2 to 1.0 phr, of zinc oxide particles having a diameter of less than 20 nanometers.

In an other aspect of this invention, the zinc oxide particles have a diameter of less than 12 nanometers.

In a further aspect of the invention, the filler is present in an amount ranging from 35 to 110 phr.

The term "phr" as used herein, and according to conventional practice, refers to "parts by weight of a respective material per 100 parts by weight of rubber, or elastomer."

The present invention may be used to process sulfur-vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect, the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. The 3,4-polyisoprene rubber (3,4-PI) is considered beneficial for a purpose of enhancing a tire's traction when it is used in a tire tread composition. The 3,4-PI, and use thereof, is more fully described in U.S. Pat. No. 5,087,668. The cis 1,4-polybutadiene rubber (BR) is considered to be beneficial for a purpose of enhancing a tire tread's wear.

The filler may also, especially in addition to silica, comprise carbon black, modified carbon black, silica, modified silica, silicon carbide, boehmite, synthetic aluminosilicates, natural aluminosilicates, titanium dioxide and organic fillers such as ground forms of polystyrene, polypropylene, polyurethane and phenolic resins.

Representative carbon blacks which are suitable include those known under the ASTM designation S212, N103, N110, N121, N166, N219, N220, N231, N234, N242, N270, N285, N293, N294, S300, S301, S315, N326, N327, N330, N332, N339, N347, N351, N356, N358, N363, N375, N539, N542, N550, N568, N601, N650, N660, N683, N741, N754, N762, N765, N774, N785 and N787.

Siliceous fillers that can be used include, for example, silicates and both pyrogenic and precipitated finely dispersed silicas. Such highly dispersed silicas (silicon dioxide) for use as the small particles have a BET surface area in the range of between 50 and 400 square meters per gram. The BET method of measuring surface area is described in the *Journal of the American Chemical Society*, Volume 60, page 304 (1930). Such silica fillers can be produced, for example, by precipitation from solutions of silicates; e.g., sodium silicate.

The silica fillers can also be produced by a silica Sol-Gel process including other metal-oxide gels, such as $ZrO_2$, $TiO_2$ and $Al_2O_3$. There can also be used flame hydrolysis of volatile silicon halides; e.g., silicon tetrachloride, or by electric arc processes. These silicas, in a given case, can also be present as mixed oxides or oxide mixtures with oxides of the metals aluminum (alumina), magnesium (magnesium oxide), calcium (calcium oxide), barium (barium oxide), zinc (zinc oxide), zirconium (zirconium oxide) or titanium (titanium dioxide).

Synthetic silicates include, for example, aluminum silicate or alkaline earth silicates, such as magnesium or calcium silicates with specific surface areas of from 20 to 400 square meters per gram.

Preferably, the siliceous filler is of the type obtained by precipitation from a soluble silicate; e.g., sodium silicate, as outlined in further detail in U.S. Pat. No. 2,940,830 and especially in U.S. Pat. No. 5,066,420.

These precipitated amorphous hydrates silica pigments have an $SiO_2$ content of at least 80 or 85, preferably at least 90, more preferably 93 to 97 percent by weight on an anhydrous basis; i.e., including bound water.

The continuous precipitation method according to U.S. Pat. No. 5,066,420 involves precipitation of a sodium silicate solution and subsequent growing conditions conducive to the formation of nanoscaled primary particles of silica.

It is readily understood by those having skill in the art that the rubber composition can be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, waxes, antioxidants and antiozonants and peptizing agents.

As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise 0.5 to 10 phr, usually 1 to 5 phr. Typical amounts of processing aids comprise 1 phr to 50 phr. Such processing aids can include, for example, aromatic, naphthenic, and/or paraffinic processing oils. Typical amounts of antioxidants comprise 1 to 5 phr. Representative antioxidants may be, for example, diphenyl-p-phenylenediamine and others, such as, for example, those disclosed in *The Vanderbilt Rubber Handbook* (1978), pages 344 to 346. Typical amounts of antiozonants comprise 1 to 5 phr. Typical amounts of fatty acids, if used, which can include stearic acid comprise 0.5 to 3 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

In one aspect of the present invention, the sulfur-vulcanizable rubber composition is sulfur-cured or vulcanized. Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 to 4, preferably 0.8 to 1.5, phr. In another embodiment, combinations of a primary and a secondary accelerator might be used with the secondary accelerator being used in smaller amounts, such as from 0.05 to 3 phr, in order to activate and to improve the properties of the vulcanizate. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition containing the filler and the zinc oxide can also be subjected to a thermomechanical mixing step in the non-productive stage comprising a mechanical working in a mixer or extruder at a temperature between 140° C. and 190° C. for a period of time suitable in order to produce a rubber. The appropriate duration of the thermomechanical working varies as a function of the operating conditions and the volume and nature of the components. For example, the thermomechanical working may be from 1 to 20 minutes.

Vulcanization of the rubber composition of the present invention is preferably conducted at temperatures ranging from 110° C. to 180° C.

Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

In a first preferred embodiment of the invention, zinc oxide particles with a mean diameter of less than 20 nanometers, preferably of less than 12 nanometers, are prepared according to the teaching of DE 199 07 704 A1. These particles are mixed with a processing additive like a wax, a fatty acid, a resin, or, preferably, an oil leading to a sol with dispersed nanoscaled zinc oxide particles therein. Then, this mixture is added to the prepared rubber composition containing the filler in the non-productive stage. The amount of zinc oxide in the mixture with the processing additive is such that the rubber composition comprises 0.2 to 1.0 phr, for example 0.8 phr, 0.6 phr or 0.4 phr, of zinc oxide after mixing. This process uses the possibility to redisperse nanoscaled zinc oxide particles prepared according to DE 199 07 704 A1 in organic materials like a usual processing additive in the rubber mixing art, and then to introduce the zinc oxide together with the processing additive into the prepared rubber composition preferably in the non-productive stage.

In summary, this process allows a considerable reduction of zinc oxide in the rubber composition, if desired, without negative impact on the following curing or vulcanization process due to the high dispersivity and high chemical activity of the nanoscaled zinc oxide particles.

In a second preferred embodiment of the invention, zinc oxide particles with a mean diameter of less than 20 nanometers, preferably of less than 12 nanometers, are prepared according to the teaching of DE 199 07 704 A1 and added to an preferably anhydrous silica powder with nanoscaled silica particles prepared according to U.S. Pat. No. 5,066,420. Then, this mixture of a silica filler and nanoscaled zinc oxide particles is undergone the well-known "pearl-process" to form pearls with a diameter of about 2 mm, for example, before being added to the prepared rubber composition preferably in the non-productive stage. This process uses the possibility to introduce the zinc oxide particles together with the silica particles like a "filler" into the rubber composition. The amount of zinc oxide in the mixture with the silica filler is such that the rubber composition comprises 0.2 to 1.0 phr, for example 0.8 phr, 0.6 phr or 0.4 phr, of zinc oxide after mixing.

Again, this process allows a considerable reduction of zinc oxide in the rubber composition, if desired, without negative impact on the following curing or vulcanization process due to the high dispersivity and chemical activity of the nanoscaled zinc oxide particles. It also leads, in tendency, to smaller silica particles as the nanoscaled zinc oxide particles hamper a re-aggregation of silica particles and ease their redispersion within the rubber composition.

In a third preferred embodiment of the invention, zinc oxide particles with a mean diameter of less than 20 nanometers, preferably of less than 12 nanometers, are prepared according to the teaching of DE 199 07 704 A1 and then added to a master-batch with at least one polymer. The preparation of such a masterbatch is described in more detail in U.S. Pat. No. 6,555,606. Preferably, the polymer is one of the polymers to be added to the rubber composition anyway. Afterwards, this masterbatch is mixed with the prepared rubber composition, preferably in the non-productive stage. The amount of zinc oxide in the master batch is such that the rubber composition comprises 0.2 to 1.0 phr, for example 0.8 phr, 0.6 phr or 0.4 phr, of zinc oxide after mixing.

Again, this process allows a considerable reduction of zinc oxide in the rubber composition, if desired, without negative impact on the following curing or vulcanization process due to the high dispersivity and chemical activity of the nanoscaled zinc oxide particles.

In a fourth embodiment of the invention, zinc oxide particles with a mean diameter of less than 20 nanometers, preferably of less than 12 nanometers, are prepared according to the teaching of DE 199 07 704 A1 and then treated in a plasma. This plasma treatment can be done, for example, while mixing the zinc oxide particles in a drum. It leads to a modification of the surface of the zinc oxide particles with regard to their chemical and electrical properties thus easing their dispersibility in a rubber composition. Afterwards, the plasma activated ZnO particles are directly added to a prepared rubber composition in an amount of 0.2 to 1.0 phr, for example 0.8 phr or 0.6 phr or 0.4 phr, preferably in the non-productive stage and mixed with it.

What is claimed is:

1. A tire having at least one component, the component comprising a rubber composition comprising (a) 100 parts by weight of at least one rubber containing olefinic unsaturation, (b) 1 to 250 phr of a filler, and (c) 0.1 to 1.5 phr of zinc oxide particles having a diameter of less than 10 nanometers.

2. A tire according to claim 1, wherein said filler comprises primary particles of silica particles having a diameter in a range of 5 to 25 nanometers which form at least partially clusters or aggregates having a diameter in a range of from 40 nanometers to 500 nanometers.

3. A tire according to claim 1 wherein said rubber containing olefinic unsaturation is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

4. A tire according to claim 1, comprising at least one additional diene-based elastomer.

5. A tire comprising a sulfur-vulcanized rubber composition which is prepared by heating the sulfur-vulcanized rubber composition to a temperature ranging from 100° C. to 200° C. in the presence of a sulfur-vulcanizing agent, the sulfur-vulcanized rubber composition comprising:

(a) 100 parts by weight of at least one rubber containing olefinic saturation, (b) 1 to 250 phr of a filler, and (c) 0.1 to 1.5 phr of zinc oxide particles having a mean diameter of less than 10 nanometers.

6. A tire according to claim 1, wherein said at least one component is a tread.

7. A tire according to claim 5, wherein said filler comprises primary particles of silica particles having a diameter in a range of 5 to 25 nanometer which at least partially form clusters or aggregates having a diameter in a range of from 40 nanometer to 500 nanometer.

8. A tire according to claim 5, wherein said rubber containing olefinic unsaturation is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

9. A tire according to claim 5, wherein said rubber composition comprises at least one additional diene-based elastomer.

10. A tire according to claim 5, wherein said at least one component is a tread.

11. A method of processing a rubber composition, comprising the steps of (a) mixing 1 to 250 phr of a filler and 0.1 to 1.5 phr of zinc oxide particles having a diameter of less than 10 nanometers to form a first mixture; and (b) mixing the first mixture with 100 parts by weight of at least one rubber containing olefinic unsaturation.

12. A method of processing a rubber composition comprising the steps of (a) mixing 0.1 to 1.5 phr of zinc oxide particles having a diameter of less than 10 nanometers with a processing additive to form a first mixture; and (b) mixing the first mixture with with a second mixture comprising from 1 to 250 phr of a filler and 100 parts by weight of at least one rubber containing olefinic unsaturation.

13. A method of processing a rubber composition, comprising the steps of (a) preparing a masterbatch comprising 0.1 to 1.5 phr of zinc oxide particles having a mean diameter of less than 10 nanometers and at least one polymer; and (b) mixing the masterbatch with a mixture comprising 100 parts by weight of at least one rubber containing olefinic unsaturation and 1 to 250 phr of a filler.

14. The method of claim 12 wherein the processing additive comprises an oil, a wax, a fatty acid or a resin.

15. The method of claim 11, wherein said rubber composition is thermomechanically mixed in step (b) at a rubber temperature in a range of from 140° C. to 190° C. for a mixing time of from 1 to 20 minutes.

16. The method of claim 12, wherein said rubber composition is thermomechanically mixed in step (b) at a rubber temperature in a range of from 140° C. to 190° C. for a mixing time of from 1 to 20 minutes.

17. The method of claim 13, wherein said rubber composition is thermomechanically mixed in step (b) at a rubber temperature in a range of from 140° C. to 190° C. for a mixing time of from 1 to 20 minutes.

* * * * *